Patented June 6, 1939

2,161,066

UNITED STATES PATENT OFFICE 2,161,066

SELENIUM-CONTAINING CATALYST

William Alfred La Lande, Jr., Upper Darby, Pa.

No Drawing. Application December 3, 1937,
Serial No. 177,893

13 Claims. (Cl. 260—684)

The present invention relates to selenium-containing catalysts, activators or reducing agents, and relates more particularly to a method for the preparation of selenium-containing catalysts and the employment thereof in the dehydrogenation or reduction of organic compounds.

A principal object of this invention is the preparation of selenium-containing catalysts of such form that the selenium component is in a highly active state, is substantially uniformly distributed or dispersed throughout the catalyst particles or mass, and is readily accessible for catalyzing or activating the dehydrogenation or reduction of organic compounds.

A further object of this invention is the preparation of catalysts or activators comprising highly active selenium uniformly distributed or dispersed throughout a relatively inert carrier or supporting medium, preferably of the nature of argillaceous adsorbent substances or materials of similar character having a high degree of porosity and adsorbent power.

A further object of this invention is the employment of the selenium-containing catalysts or activators, prepared in accordance with the methods hereinafter described, in the alteration or change in structure and/or chemical composition of organic compounds, and particularly in the dehydrogenation or reduction of such compounds.

Heretofore it has been conventional practice to effect dehydrogenation of organic compounds with metallic selenium by contacting such compounds with the selenium at temperatures such that the selenium is maintained in a pasty or semi-fluid state. Such practice has proved highly unsatisfactory since inordinately large quantities of selenium and very vigorous agitation are necessary in order to effect even a mediocre degree of dehydrogenation. Furthermore, in many cases where the dehydrogenated products are not volatile at the temperature of dehydrogenation and therefore must be separated from the selenium by decantation or solvent extraction, such separation is exceedingly difficult since the molten selenium forms sticky or gummy, tenacious masses which entrain the dehydrogenated products, and which, per se, are difficult and troublesome to remove from the vessel in which the dehydrogenation treatment has been effected.

However, in accordance with my invention, I have overcome the mentioned difficulties by providing a selenium catalyst or activator in a form which is easily prepared and readily handles; which presents a greatly increased catalyzing or activating surface per unit weight of selenium; and which is readily separable from the products of the dehydrogenation reaction.

In the practice of this invention a selenium compound, which may be either inorganic or organic, is impregnated or distributed upon a carrier or supporting medium and such impregnated medium is then subjected to the action of a reducing agent whereby the selenium compound is reduced to elemental selenium. By employing a highly porous and adsorptive carrier, a substantially uniform distribution of selenium is obtained over a very large surface area. In this manner a very high efficiency per unit weight of selenium is attained when utilizing the catalyst or activator in chemical reactions, and particularly those involving the dehydrogenation of organic compounds.

Among the selenium compounds which may be suitably employed in impregnating the carrier or supporting medium, with the assistance of solvents if necessary, are selenium dioxide; selenium monochloride; selenium oxyhalides such as selenium oxychloride; the selenites and selenates of the elements of Groups I to VIII of the periodic system, and particularly the water-soluble selenites and selenates of $NH_4$, Na, K, Mg, Cu, Co, Ni, Zn and Mn; the alkali metal and ammonium selenides; organic compounds of selenium such as alkyl and aryl selenites and selenates; and organo-selenium compounds in which selenium is directly bonded to a carbon atom, including the alkyl and aryl selenides. Selenium compounds which are liquid, or readily rendered fluid by heating, may be impregnated in or distributed through the carrier or supporting medium directly. Other selenium compounds, which may be normally solid, are preferably dissolved in a suitable solvent and the resulting solution employed for impregnating the carrier. Suitable solvents include water; the aliphatic alcohols such as methyl, ethyl, propyl and isopropyl alcohols; ether; benzene, toluene; chloroform; carbon tetrachloride, and carbon bisulfide.

The media for supporting the selenium are preferably inert granular solids having a porous structure and relatively high absorbent and/or adsorbent powers. Argillaceous adsorbent materials such as fuller's earth, bentonite, montmorillonite, hydrous aluminum and magnesium silicates, bauxite, acid activated clays, silica gel, and artificially prepared silicates of Ca, Mg, Al and Cu are the preferred supporting media or carriers. Other suitable but less desirable supporting media include china clay, infusorial earth, pumice, asbestos and insoluble oxides of Ti, Zr and the rare earths.

For the reduction of the selenium compound impregnated in or distributed through the carrier or supporting media, a variety of suitable agents are available. Among these may be mentioned hydrogen, sulfur dioxide, ammonia, hydrogen sulfide, hydrogen selenide, carbon monoxide, hydroxylamine and hydrazine and their salts, ferrous salts, mercurous salts, stannous salts, titanous salts, sodium sulfite, sodium bisulfite, sodium stannite and disodium hydrogen arsenite. Organic compounds containing a double bond with a methylene group ($CH_2$) adjacent one of the doubly bonded carbon atoms, for example, cyclohexene, pinene and pentene-1, may be suitably employed as reducing agents. The reduction of the selenium compound may be effected by the reducing agents in either the liquid or gaseous phase. For example, $H_2$, CO, $SO_2$ and $NH_3$, are preferably employed as gaseous reducing agents at temperatures of from about 30° C. to about 360° C. The normally solid reducing agents are preferably employed in aqueous solution, whereby the soluble by-products may be dissolved and washed out leaving the selenium dispersed throughout the carrier or supporting medium.

In effecting impregnation of the carrier or supporting medium with the selenium compound and the reduction thereof to elemental selenium, the following methods have been found suitable:

(1) A selenium compound is dissolved in a suitable solvent and mixed with the carrier, the solvent thereafter being removed by heating and/or reduction in pressure. Or, the selenium compound, if liquid, is mixed with the carrier, or if solid, is rendred fluid by heating and then mixed with the carrier. The carrier, upon completion of the impregnating step, is then subjected to the action of a gaseous, liquid or solid compound capable of reducing the selenium compound to elemental selenium. The reduction may be effected at normal or elevated temperatures and pressures, depending upon the nature of the reducing agent and the ease with which reduction may be effected. For example, a carrier such as fuller's earth or other adsorbent material is impregnated or saturated with a solution (preferably alcoholic) of selenium dioxide by soaking the fuller's earth in the selenium dioxide solution, draining off the excess solution and then drying the impregnated earth at normal or elevated temperatures to remove the solvent. This operation may be repeated until the desired concentration of selenium dioxide in the fuller's earth has been obtained. The earth containing the selenium dioxide is then subjected to the action of a reducing agent, preferably a gaseous reducing agent such as ammonia ($NH_3$); carbon monoxide (CO); hydrogen ($H_2$); hydrogen sulfide ($H_2S$); hydrogen selenide ($H_2Se$); sulfur dioxide ($SO_2$); or flue gas containing CO. The step of reducing the selenium dioxide in the fuller's earth may be carried on at temperatures ranging from atmospheric temperature up to about 360° C. When employing anhydrous gaseous ammonia as the reducing agent, the practical reducing temperature lies within the range of from about 230° C. to about 360° C., and preferably is of the order of 260° C. to 280° C. The reduction may be represented by the following equation:

$$3SeO_2 + 4NH_3 \rightarrow 3Se + 6H_2O + 2N_2$$

In lieu of employing normally gaseous reducing agents in the reduction step above described, a solution containing a soluble reducing agent may be utilized. For example, aqueous or alcoholic solutions of hydroxylamine ($NH_2OH$); hydrazine ($NH_2NH_2$); sodium sulfite ($Na_2SO_3$); sodium bisulfite ($NaHSO_3$); sodium stannite ($Na_2SnO_2$); sodium dihydrogen hypophosphite ($NaH_2PO_2$); ferrous sulfate ($FeSO_4$); and other soluble reducing agents are suitable. Upon completion of the reduction, the undesirable by-products, such as salts, may be washed from the selenized carrier with water or other solvent.

2. A selenium compound, capable of yielding elemental selenium upon heating, is dissolved in a suitable solvent and mixed with a carrier, and the solvent is removed by moderate heating and/or reduction of pressure. The resulting carrier impregnated with the selenium compound is then heated to a temperature sufficient to decompose the compound to produce elemental selenium. For example, a carrier such as fuller's earth or other adsorbent material is impregnated with an aqueous solution of an ammonium salt of a selenium acid such as ammonium selenate ($NH_4)_2SeO_4$, the excess solution is drained from the fuller's earth and the impregnated earth then dried to remove the solvent. The earth containing the ammonium selenate is then heated at an elevated temperature, whereby the ammonium salt is decomposed, leaving elemental selenium substantially uniformly distributed throughout the fuller's earth. This step, which may be termed "auto-reduction", is represented by the following equation:

$$(NH_4)_2SeO_4 \rightarrow Se + N_2 + 4H_2O$$

The selenium-containing catalysts or activators of my invention may be produced in various forms. For example, when finely divided or acid activated clay is employed as the carrier, the resulting selenized product is a free-flowing, dry powder of about 100–200 mesh or finer. This material, if desired, may be formed into pellets, tablets, or masses of any suitable size or shape. On the other hand, when a carrier such as fuller's earth of 5–15, 15–30, or 30–60 mesh is employed, the selenized product is granular in form and may be utilized directly as an agent in the dehydrogenation or reduction of organic compounds. The selenium content of the catalyst or activator may be varied from about 1% by weight or less, up to about 50% by weight, depending to some extent upon the nature of the carrier employed. Also, depending upon the reducing agent and the conditions under which the reduction is carried on, the selenium in the carrier or supporting medium may be either of the red or grey variety. For example, reduction of selenium dioxide by ammonia at elevated temperature usually produces red selenium, whereas reduction of the dioxide by an organic compound such as wood rosin (or abietic acid) produces grey selenium.

In utilizing the selenium-containing catalysts or activators in the treatment of organic compounds, and particularly in the dehydrogenation thereof, I have found that the following methods of bringing the organic compounds into contact with the selenized agent may be advantageously employed:

(1) The organic compound, if a liquid, may be soaked up in an excess of the catalyst, for example, selenium-impregnated fuller's earth. Or, the catalyst may be kept suspended in an excess of the organic compound by suitable agitating means.

(2) The organic compound, if a liquid, may be dissolved in a solvent of lower boiling point and the solution soaked up in or admixed with the selenium-impregnated carrier. The solvent may then be removed by heating and/or reduction in pressure.

(3) The organic compound, if a liquid, may be dropped into or otherwise introduced into the heated selenium-impregnated carrier. A stream of gaseous fluid may be utilized in assisting the introduction of the organic compound into contact with the catalyst.

(4) The organic compound, if a solid, may be melted and soaked up in or admixed with the selenium-impregnated carrier.

(5) The organic compound, if a solid, may be dissolved in a suitable solvent, and the solution soaked up in or admixed with the selenium-impregnated carrier. The solvent may then be removed by heating and/or reduction of pressure.

(6) The organic compound, if a solid, may be dropped into or otherwise introduced into the heated selenium-impregnated carrier. A stream of gaseous fluid may be utilized in assisting the introduction of the organic compound into contact with the catalyst.

(7) The organic compound, if normally gaseous, or if reduced to a gaseous or vaporous state, may be passed over and/or through the heated selenium-impregnated carrier.

The dehydrogenation of organic compounds, in the presence of the selenium-containing catalyst or activators of my invention, is most favorably carried out at temperatures within the range of from about 250° C. to about 400° C. The pressure maintained during dehydrogenation may be sub-atmospheric, atmospheric or super-atmospheric, depending to a certain extent upon the temperatures employed and the volatility of the compound undergoing dehydrogenation. The selenium-containing catalysts or activators of my invention may be utilized in the treatment of a variety of organic compounds. For example, petroleum or other hydrocarbon oils, and particularly the lower boiling distillates thereof such as gasoline may be dehydrogenated to improve the anti-knock quality thereof. Naphthenic hydrocarbons or hyrogenated aromatics may be dehydrogenated to produce true aromatic compounds. Rosin or abietic acid may be dehydrogenated to yield retene. These and a variety of other compounds may be advantageously treated in the presence of my selenium-containing catalysts or activators.

The following example will serve to further illustrate my invention, and is not to be construed as limiting the scope thereof.

100 parts of 15-30 mesh fuller's earth (previously dried at 750° F. to remove moisture) was admixed with 100 parts of ethyl alcohol containing 7 parts of selenium dioxide. The impregnated earth was then warmed at about 70° C. until substantially all of the solvent, i. e., ethyl alcohol, was removed by vaporization. In this manner a substantially uniform distribution of selenium dioxide was obtained throughout the mass of earth particles. After removal of the solvent, the impregnated earth was subjected to treatment with a reducing agent, i. e., 100 parts of ethyl alcohol containing about 5 parts of hydrazine ($NH_2NH_2$). The selenium dioxide initially absorbed by the fuller's earth was reduced to elemental selenium, in accordance with the equation:

$$SeO_2 + NH_2NH_2 \rightarrow Se + N_2 + 2H_2O$$

Upon completion of the reduction, the alcohol was removed from the selenium-containing earth by drying at about 70° C. In the selenium dioxide impregnating step and in the subsequent reduction step, the quantity of solvent employed, i. e., 100 parts of ethyl alcohol, was completely absorbed by the fuller's earth, thereby insuring that substantially all of the reagents were contained in the earth. By operating in this manner, little or no selenium is lost. If desired, the selenium-containing earth, after reduction, may be washed with water or alcohol to insure removal of traces of unreduced selenium dioxide, or hydrazine. The product resulting from the above described process was a dry, granular earth containing elemental selenium substantially uniformly distributed throughout the pores and surfaces of the earth particles. The content of elemetal selenium was about 5 parts per 100 parts of the fuller's earth carrier. Due to the extremely porous nature of the carrier it was possible to obtain a very large selenium surface area per unit weight of selenium, thus increasing the effectiveness of the selenium upon subsequent use as a catalyst or activator.

The selenium-containing fuller's earth, as above prepared, was employed as a catalyst, activator, or reducing agent in the treatment of organic compounds as illustrated in the following examples.

(1) Tetrahydronaphthalene was impregnated in the Se-fuller's earth and the mixture was heated at the boiling point of the tetrahydronaphthalene, i. e., about 205° C., for a period of about 20 hours. The mixture was then cooled and extracted with benzol, the extract filtered from the earth and thereafter concentrated by evaporation. The concentrated extract was then cooled and the dehydrogenation product, i. e., naphthalene, was crystallized and separated. A yield of 80% of substantially pure naphthalene was obtained.

(2) A solution of abietic acid in ethyl alcohol was impregnated in the Se-fuller's earth and the alcohol removed by gentle heating. The Se-fuller's earth containing the abietic acid was then heated at a temperature of 275° C. to 350° C. for a period of about 25 hours. The mixture was then cooled, extracted with benzol, the extract filtered from the earth and thereafter concentrated by evaporation, whereupon the dehydrogenation product, i. e., retene, crystallized from the solution. A yield of about 85% of retene was obtained.

(3) A solution of cadinene in benzol was impregnated in the Se-fuller's earth and the benzol was removed by gentle heating. The Se-fuller's earth containing the cadinene was then heated at a temperature of 275° C. to 300° C. for a period of about 18 hours. The mixture was then cooled and extracted with benzol, the extract filtered from the earth and thereafter concentrated by evaporation, whereupon the dehydrogenation product, i. e., cadalin (methyl isopropyl naphthalene) crystallized from the solution. A yield of about 30% of cadalin was obtained.

(4) A solution of 2 methyl, 4 keto cyclohexane in ethyl ether was impregnated in the Se-fuller's earth and the ether was removed by vaporization. The mixture, substantially free of ether, was then heated at a temperature of 280° C. to 300° C. for a period of about 20 hours. The mixture was then cooled and extracted with benzol, the extract filtered from the earth and thereafter evaporated to dryness. The dry residue containing the reduction product, i. e., meta-cresol, was then distilled at a pressure of about 1 m/m. absolute, and a yield of about 72% of meta-cresol was obtained as distillate.

(5) A solution of 1,2,3,4-tetrahydrophenanthrene in benzol was impregnated in the Se-fuller's earth and the benzol was removed by gentle heating. The mixture, substantially free of benzol, was then heated at a temperature of 280° C. to 340° C. for a period of about 30 hours. The mixture was then cooled and extracted with benzol, the extract filtered from the earth and thereafter evaporated to dryness. The dry residue containing the dehydrogenation product, i. e., phenanthrene, was then distilled at a pressure of about 1 m/m. absolute, and a yield of about 90% of phenanthrene was obtained as distillate.

(6) A solution of cholesterol in ethyl alcohol was impregnated in the Se-fuller's earth and the alcohol was removed by vaporization. The mixture, substantially free of alcohol, was then heated at a temperature of 300° C. to 360° C. for a period of about 30 hours. The mixture was then cooled and extracted with benzol, the extract filtered from the earth and thereafter concentrated by evaporation, whereupon a substantial yield of crystalline methyl cyclopentophenanthrene and chrysene was obtained.

In lieu of utilizing hydrazine ($NH_2NH_2$) as the reducing agent in the preparation of the selenium-containing agent above employed in the treatment of organic compounds, I may effect reduction of the selenium dioxide in the fuller's earth to elemental selenium by means of an oxidizable organic compound. For example, the selenium dioxide contained in the fuller's earth carrier may be reduced to selenium by heating in intimate contact with an organic compound containing a methyl group ($CH_3-$) or a methylene group ($-CH_2-$) adjacent a carbonyl group ($=CO$), i. e., aldehydes or ketones.

Or, other organic compounds may be employed as reducing agents in the preparation of my selenium-containing catalyst or agent. For example, a carrier such as fuller's earth is first uniformly impregnated with selenium dioxide, as described hereinbefore, and to the dried, selenium dioxide-containing earth is added a solution of an organic compound such as abietic acid or rosin. Such solution may be made up simply by dissolving the abietic acid or rosin in methyl alcohol, ethyl alcohol, acetone, gasoline or benzol. The mixture is then heated to a temperature sufficient to drive off the solvent and cause an oxidation-reduction reaction to take place, the abietic acid or rosin being oxidized and the selenium dioxide being reduced to elemental selenium. After completion of this step the oxidation products are thoroughly leached from the earth mixture by means of an organic solvent and the earth is dried. There is thus produced a remarkably active catalyst or agent comprising fuller's earth substantially uniformly impregnated with elemental selenium.

The selenium-containing catalysts or agents of my invention are to be distinguished from mere mechanical mixtures of finely divided selenium with other active catalytic materials or spacing agents which may have been employed heretofore. By utilizing, in accordance with my invention, supporting agents or carriers such as fuller's earth or other argillaceous adsorbents, I am able to provide selenium-containing agents having a tremendous surface area of active selenium per unit weight of selenium content. In other words, substantially all the available surface area of the fuller's earth, including the most minute capillaries, is uniformly covered with a film of elemental selenium, thus insuring a maximum catalytic or dehydrogenating activity per unit weight of selenium.

While hereinabove, I have shown the use of a dehydrogenating or reducing agent consisting of fuller's earth impregnated with elemental selenium, in the treatment of organic compounds, my invention is not limited thereto, since I may employ other porous, adsorbent materials as carriers or supporting media for the selenium. More particularly, relatively inert adsorbent materials are preferred, including the argillaceous adsorbents such as decolorizing clay, bentonite, montmorillonite, hydrous magnesium and aluminum silicates, bauxite and acid activated clays. And, in lieu of selenium, I may employ tellurium or mixtures of selenium and tellurium as the active element in my catalyst or reducing agent.

What I claim is:

1. An agent for promoting dehydrogenation of organic compounds comprising a relatively inert argillaceous adsorbent substantially uniformly impregnated with elemental selenium, said selenium forming a substantially continuous film throughout the pores and surfaces of said argillaceous adsorbent.

2. An agent for promoting dehydrogenation of organic compounds comprising fuller's earth substantially uniformly impregnated with elemental selenium, said selenium forming a substantially continuous film throughout the pores and surfaces of said fuller's earth.

3. The method of preparing a selenium-containing catalyst which comprises impregnating a relatively inert argillaceous adsorbent with a reducible selenium compound and subjecting said impregnated adsorbent to the action of a reducing agent to reduce said selenium compound to elemental selenium, said selenium forming a substantially continuous film throughout the pores and surfaces of said inert argillaceous adsorbent.

4. The method of preparing a selenium-containing catalyst which comprises impregnating fuller's earth with a reducible selenium compound and subjecting said impregnated fuller's earth to the action of a reducing agent to reduce said selenium compound to elemental selenium, said selenium forming a substantially continuous film throughout the pores and surfaces of said fuller's earth.

5. The method of preparing a selenium-containing catalyst which comprises impregnating a relatively inert argillaceous adsorbent with a solution of a reducible selenium compound, effecting removal of the solvent from the impregnated adsorbent, and subjecting said impregnated adsorbent to the action of a reducing agent to reduce said selenium compound to elemental selenium, said selenium forming a substantially continuous film throughout the pores and surfaces of said inert argillaceous adsorbent.

6. The method of preparing a selenium-containing catalyst which comprises impregnating fuller's earth with a solution of a reducible selenium compound, effecting removal of the solvent from the impregnated earth, and subjecting said impregnated earth to the action of a reducing agent to reduce said selenium compound to elemental selenium, said selenium forming a substantially continuous film throughout the pores and surfaces of said fuller's earth.

7. The method of preparing a selenium-containing catalyst which comprises impregnating a relatively inert argillaceous adsorbent with a solution of selenium dioxide, removing the solvent by vaporization, and reducing the selenium dioxide contained in said adsorbent to elemental selenium, said selenium forming a substantially continuous film throughout the pores and surfaces of said inert argillaceous adsorbent.

8. The method of preparing a selenium-containing catalyst which comprises impregnating a relatively inert argillaceous adsorbent with an auto-reducible selenium compound and heating said impregnated absorbent to a temperature sufficient to effect reduction of said selenium compound to elemental selenium, said selenium forming a substantially continuous film throughout the pores and surfaces of said inert argillaceous adsorbent.

9. The method of preparing a selenium-containing catalyst which comprises impregnating fuller's earth with an ammonium salt of a selenium acid and heating said impregnated earth to a temperature sufficient to effect reduction of said ammonium salt to elemental selenium, said selenium forming a substantially continuous film throughout the pores and surfaces of said fuller's earth.

10. In a method for effecting dehydrogenation of an organic compound which is susceptible of dehydrogenation, the step which comprises heating said organic compound in intimate contact with a relatively inert argillaceous adsorbent substantially uniformly impregnated with elemental selenium, said selenium forming a substantially continuous film throughout the pores and surfaces of said argillaceous adsorbent.

11. In a method for effecting dehydrogenation of an organic compound which is susceptible of dehydrogenation, the step which comprises heating said organic compound in intimate contact with fuller's earth substantially uniformly impregnated with elemental selenium, said selenium forming a substantially continuous film throughout the pores and surfaces of said fuller's earth.

12. The method for effecting dehydrogenation of an organic compound which comprises admixing a solution of said compound in an organic solvent with a relatively inert argillaceous adsorbent substantially uniformly impregnated with elemental selenium, said selenium forming a substantially continuous film throughout the pores and surfaces of said inert argillaceous adsorbent, removing the organic solvent from the admixture, heating the admixture to a temperature sufficient to effect dehydrogenation of said compound, and separating the dehydrogenated product from said adsorbent.

13. The method of preparing a selenium-containing dehydrogenating agent which comprises impregnating an argillaceous adsorbent with a solution of selenium dioxide, removing solvent from the selenium dioxide-impregnated adsorbent impregnating the selenium dioxide-containing adsorbent with a solution of an oxidizable organic compound, removing solvent from the adsorbent containing said selenium dioxide and oxidizable organic compound, heating the resulting impregnated adsorbent to a temperature sufficient to cause oxidation of said organic compound and reduction of said selenium dioxide to elemental selenium, extracting the oxidized organic compound from said adsorbent with an organic solvent, and drying the resulting selenium-containing adsorbent.

WILLIAM ALFRED LA LANDE, JR.